United States Patent [19]
Sakita et al.

[11] 3,874,279
[45] Apr. 1, 1975

[54] APPARATUS FOR TREATING PROTEIN FIBERS

[75] Inventors: Takashi Sakita, Yokohama; Hiroshi Kanda, Zushi; Yasumasa Yamagami, Sagamihara, all of Japan

[73] Assignee: Nisshin Seiyu Kabushiki Kaisha, Tokyo, Japan

[22] Filed: June 27, 1972

[21] Appl. No.: 266,679

[30] Foreign Application Priority Data
Mar. 21, 1972 Japan.............................. 47-28275

[52] U.S. Cl.................................. 99/534, 99/516
[51] Int. Cl............................................. A23J 3/00
[58] Field of Search........ 99/484, 516, 534; 68/183, 68/205; 8/149.1; 118/30, 304

[56] References Cited
UNITED STATES PATENTS

| | | | |
|---|---|---|---|
| 3,149,554 | 9/1964 | Greenspan | 99/534 |
| 3,269,297 | 8/1966 | Hilgeland | 99/534 |
| 3,314,356 | 4/1967 | Dechaine et al. | 99/534 |
| 3,554,113 | 1/1971 | Page | 99/534 |
| 3,646,908 | 5/1972 | Bowen et al. | 118/304 |

Primary Examiner—Robert L. Bleutge
Assistant Examiner—Arthur O. Henderson
Attorney, Agent, or Firm—Anthony A. O'Brien

[57] ABSTRACT

Edible protein fibers are treated by neutralizing, decoloring, deodorizing, washing or impregnating with binders, flavoring materials or fat, the fibers in an apparatus, including an elongated receptacle containing a treating fluid at a predetermined level. A bundle of protein fibers is moved longitudinally through the receptacle while being immersed in the treating fluid. The receptacle is provided at its base portion, with a plurality of raised supports for preventing entanglement of the protein fibers and with a plurality of bubble producing nozzles, and at its top portion, with a plurality of nozzles for spraying the treating fluid.

6 Claims, 5 Drawing Figures

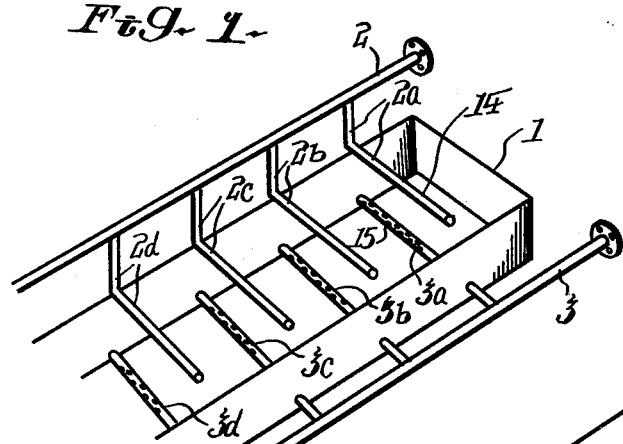
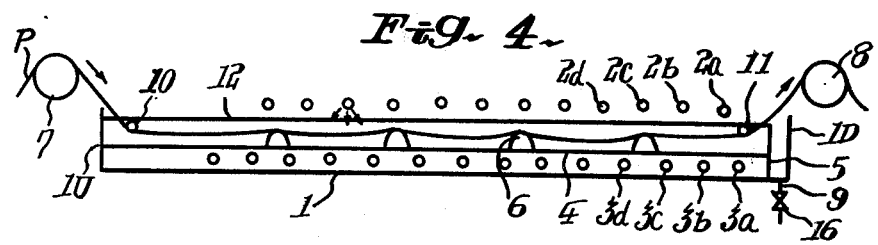
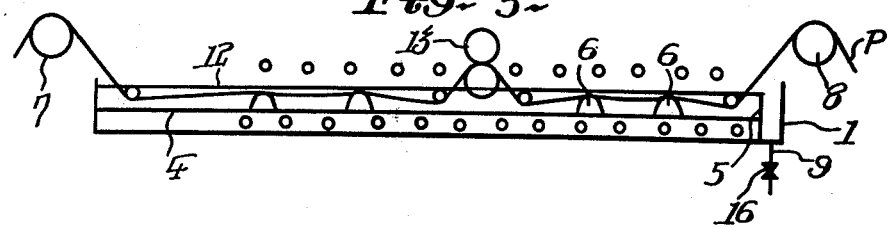

1

APPARATUS FOR TREATING PROTEIN FIBERS

BACKGROUND OF THE INVENTION

The present invention relates to an apparatus for continuously treating edible protein fibers, and more particularly apparatus for continuously treating, as for example, neutralizing, decoloring, deodorizing, or washing a bundle of edible protein fibers, or impregnating the same with binders, flavoring materials or fat, in a short time.

In the prior art processes, there is no particularly established apparatus refining edible protein fibers. Apparatus employed for refining textile fibers are not suitable for edible protein fibers since the nature of protein fibers is different from textile fibers in terms of the fiber strength and other qualities. Therefore, various systems, such as a treating tank which is vibrated in a tipped condition, have been devised for continuously refining protein fibers in a bundle. However, none of the prior art systems is not adequate for uniformly treating a bundle of protein fibers having a size of several hundred thousand denier while sufficiently loosening the same. Moreover, the prior art devices are complicated and expensive. The present invention has been devised to overcome disadvantages of the prior art refining apparatus as described hereinabove.

SUMMARY OF THE INVENTION

An object of the present invention is to provide an apparatus of simple construction fabricated at small cost for continuously treating protein fibers, such as neutralizing, decoloring, deodorizing, washing, or impregnating with binders, flavoring materials or fats, protein fibers of several hundred thousand denier by passing them continuously through a treating tank.

According to the present invention, there is provided an apparatus for treating edible protein fibers, including an elongated receptacle having rectangular horizontal cross-section for containing a treating fluid in which said protein fibers are immersed, drive means for moving said protein fibers longitudinally within said receptacle so that they are immersed in the treating fluid, and means mounted on the base portion of said receptacle at a predetermined spacing for supporting said protein fibers so as to prevent them from becoming entangled.

One feature of the present invention resides in rounded support or pillow members for preventing protein fibers from becoming entangled, in view of the protein fibers tendency to become entangled or twisted until uniform treatment is no longer possible as they are agitated by sprays of treating fluid coming down from above and by bubbles produced from below. By using such support members, a bundle of protein fibers each having a size of several hundred thousand denier can be treated uniformly in a short period of time.

BRIEF DESCRIPTION OF THE DRAWINGS

Now, one preferable embodiment of the apparatus according to the present invention will be described in detail by way of example hereinafter with reference to accompanying drawings, in which FIG. 1 is a perspective view showing a treating tank employed in the present invention, FIG. 2 is a perspective view in enlarged scale showing a bottom structure of the tank in FIG. 1, FIG. 3 is a perspective view in enlarged scale showing one part of the bottom structure in FIG. 2, FIG. 4 is a schematic view showing a refining operation of the apparatus according to the present invention, and FIG. 5 is a view similar to FIG. 4 showing the refining operation of a modified apparatus according to the present invention.

DESCRIPTION OF THE PREFERRED EMBODIMENT

Referring to FIG. 1, there is shown a treating tank 1 of elongated box-shaped configuration having a main supply pipe 2 of treating fluid located above it a gas supply main pipe 3 provided adjacent to the bottom portion of the tank 1. A number of treating fluid injection pipes 2a, 2b, 2c, etc. are branched off from the main supply pipe 2 and extended transversely over the treating tank 1. Each of those injection pipes is provided with a large number of injection nozzles 14 for spraying treating fluid into the tank. A number of gas ejecting pipes 3a, 3b, 3c, 3d, etc. are branched off from the gas supply main pipe 3 and passed through a wall of the tank 1 so as to extend transversely into the same. Each of the gas ejecting pipes is provided with a large number of gas ejecting nozzles 15 for ejecting gaseous fluid, such as air or steam, into the tank.

As shown in FIG. 2, an overflow plate 5 is provided in the tank adjacent to the right end thereof so as to maintain a predetermined level of treating fluid within the tank. The height of the overflow plate 5 will be determined in accordance with the size of the fiber bundles being treated, and is normally in a range of from 1.2 to 4 inches. A grating 4 is provided above the gas ejecting pipes 3a, 3b, 3c, etc., parallel to the bottom of the tank 1. The grating 4 is a flat plate having a large number of vent openings and is terminated at the overflow plate 5 at its right end. A number of rounded support or pillow members 6 are mounted on the grating 4 at a predetermined spacing normally in a range of from 1.65 to 9.8 feet.

As shown in FIG. 3, each support member 6 consists of a bar having a half-round cross-section and a height substantially equal to or slightly less than the height of the fluid level above the grating 4 in the tank. The support members 6 will support protein fibers, which are fed longitudinally through the tank 1, so as to prevent them from becoming entangled or twisted.

As shown in FIG. 4, a pair of feed rollers 7, 8 are mounted respectively adjacent to an upstream end 1U and a downstream end 1D of the tank 1. A pair of guide rollers 10, 11 are mounted on the tank 1 respectively at the upstream end 1U and downstream end 1D so as to be opposed to the feed rollers, 7, 8 respectively. The feed rollers 7 and 8 are respectively connected to a suitable power source (not shown) and positively actuated thereby.

FIG. 5 shows a treating tank 1 having a pair of squeeze rollers 13 for draining water out of the protein fibers. The squeeze rollers are used for treating, such as neutralizing, the fiber bundle uniformly for a short period of time. A drain pipe 9 having a suitable valve 16 connected thereto is provided on the tank 1.

In operation, treating fluid is first filled into the tank 1 up to the predetermined level 12. The treating fluid is sprayed from the nozzles 14 while gaseous fluid is ejected out of the nozzles 15. Then, a bundle P of edible protein fibers is passed about the upstream end feed roller 7 and the guide roller 10, led to the top surface of each support member 6, passed about the other guide roller 11 and the downstream end feed roller 8. Thereafter, both feed rollers 7 and 8 are actuated at a predetermined speed so as to feed the fiber bundle P in the tank 1 from the upstream end 1U to the downstream end 1D. In this case, the fiber bundle P will be transferred from left to right in the tank 1 without coming in contact with the grating 4, since it tends to be raised upwardly within the tank by the action of the bubbles produced in the bottom of the tank. Further, since the fiber bundle is supported by the support members located at a predetermined spacing, it will not become entangled or twisted. Moreover, the fiber bundle will be loosened by the action of the treating fluid sprayed from above. It is noted at this point that a continuous flow of protein fibers is not hampered by any cut filament within the bundle, since the bundle is being moved in the direction of flow of the treating fluid.

As described hereinabove, it is possible to refine protein fibers, continuously by spraying treating fluid and ejecting the gaseous fluid on fiber bundle as it is fed through the tank, according to the present invention. In addition, the apparatus according to the present invention is advantageous over the prior art device in that the refining operation is carried out uniformly and quickly, thereby saving the time required for the operation.

What is claimed is:

1. An apparatus for treating a plurality of continuous protein fibers with a treating fluid comprising
    an elongated receptacle having opposite side walls, opposite end walls and a bottom for containing the treating fluid;
    drive means at the opposite ends of the receptacle for moving a plurality of continuous protein fibers longitudinally through the receptacle such that the protein fibers are immersed in the treating fluid;
    a plurality of raised supports having rounded upper support surfaces disposed transversely across the receptacle and longitudinally spaced within the receptacle for slidingly supporting the plurality of fibers; and
    a plurality of gas ejecting nozzles longitudinally spaced along the bottom of the receptacle to eject gas into the treating fluid;
    said plurality of raised supports and plurality of gas ejecting nozzles tending to raise the plurality of protein fibers upwardly within the receptacle and to prevent entanglement and twisting of the protein fibers.

2. An apparatus as claimed in claim 1 including a plurality of fluid ejecting nozzles mounted above the fluid level in the receptacle for spraying the treating fluid over the protein fibers as they are moved longitudinally along the receptacle.

3. An apparatus as claimed in claim 1 including a grating in the bottom of the receptacle above the gas ejecting nozzles, said raised supports being mounted on top of the grating.

4. An apparatus as claimed in claim 1 including an overflow plate adjacent one end for determining the height of the level of treating fluid in the receptacle.

5. An apparatus as claimed in claim 1 wherein the raised supports include bars having half-round cross sections with the rounded surface of the bar extending to a height within a range from slightly less than to being equal to the height of the treating fluid level in the receptacle.

6. An apparatus as claimed in claim 5 including
    guide means to guide the protein fibers into the treating fluid,
    a plurality of fluid ejecting nozzles mounted above the fluid level in the receptacle for spraying the treating fluid on the fibers,
    a grating in the bottom of the receptacle disposed above the gas ejecting nozzles and upon which the flat side of the rounded bars are mounted, and
    an overflow plate adjacent one end of the receptacle for determining the height of the level of the treating fluid in the receptacle.

* * * * *